United States Patent
Kim et al.

(10) Patent No.: US 10,629,376 B2
(45) Date of Patent: Apr. 21, 2020

(54) MULTILAYER CERAMIC CAPACITOR HAVING SIDE MEMBERS

(71) Applicant: SAMSUNG ELECTRO-MECHANICS CO., LTD., Suwon-si, Gyeonggi-do (KR)

(72) Inventors: Hyung Joon Kim, Gyunggi-do (KR); Dae Bok Oh, Seoul (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 4 days.

(21) Appl. No.: 15/927,413

(22) Filed: Mar. 21, 2018

(65) Prior Publication Data

US 2018/0211786 A1    Jul. 26, 2018

Related U.S. Application Data

(63) Continuation of application No. 15/386,081, filed on Dec. 21, 2016, now abandoned, which is a
(Continued)

(30) Foreign Application Priority Data

Mar. 9, 2011   (KR) .................. 10-2011-0021080

(51) Int. Cl.
*H01G 4/224* (2006.01)
*H01G 4/30* (2006.01)
(Continued)

(52) U.S. Cl.
CPC ............. *H01G 4/224* (2013.01); *H01G 4/005* (2013.01); *H01G 4/12* (2013.01); *H01G 4/232* (2013.01); *H01G 4/30* (2013.01); *Y10T 29/435* (2015.01)

(58) Field of Classification Search
CPC . H01G 4/30; H01G 4/005; H01G 4/12; Y10T 29/435
See application file for complete search history.

(56) References Cited

U.S. PATENT DOCUMENTS

| 4,347,650 A | 9/1982 | McLarney et al. |
| 4,771,520 A | 9/1988 | Tanaka et al. |
| (Continued) | | |

FOREIGN PATENT DOCUMENTS

| JP | 63-19806 A | 1/1988 |
| JP | 04-010511 A | 1/1992 |
| (Continued) | | |

OTHER PUBLICATIONS

Murata, Chip Monolithic Ceramic Capacitos, Jan. 20, 2004, Cat No. C02E-10 (Year: 2004).*

(Continued)

*Primary Examiner* — David M Sinclair
(74) *Attorney, Agent, or Firm* — Morgan, Lewis & Bockius LLP

(57) ABSTRACT

There are disclosed a multilayer ceramic capacitor and a method of manufacturing the same. The multilayer ceramic capacitor includes: a ceramic body having a first side and a second side opposed to each other and having a third side and a fourth side connecting the first side to the second side, a plurality of inner electrodes formed within the ceramic body, and outer electrodes formed on the third side and the fourth side and electrically connected to the inner electrodes. A distance from distal edges of the inner electrodes to the first side or the second side of the ceramic body is 30 μm or less.

17 Claims, 8 Drawing Sheets

Related U.S. Application Data continuation of application No. 14/446,615, filed on Jul. 30, 2014, now abandoned, which is a continuation of application No. 13/280,886, filed on Oct. 25, 2011, now Pat. No. 8,824,119.

(51) Int. Cl.
*H01G 4/12* (2006.01)
*H01G 4/005* (2006.01)
*H01G 4/232* (2006.01)

(56) References Cited

U.S. PATENT DOCUMENTS

| | | |
|---|---|---|
| 5,548,474 A | 8/1996 | Chen et al. |
| 5,989,726 A | 11/1999 | Noji et al. |
| 7,859,823 B2 | 12/2010 | Suzuki |
| 2007/0025055 A1 | 2/2007 | Mizuno et al. |
| 2007/0202036 A1 | 8/2007 | Jongen et al. |
| 2007/0211404 A1 | 9/2007 | Kojima et al. |
| 2008/0304204 A1 | 12/2008 | Suzuki |
| 2009/0053853 A1* | 2/2009 | Onodera ............ H01G 4/2325 438/106 |
| 2010/0025075 A1* | 2/2010 | Feichtinger ............ H01C 1/142 174/126.1 |
| 2010/0085682 A1 | 4/2010 | Abe et al. |
| 2012/0250217 A1 | 10/2012 | Fukunaga et al. |
| 2012/0257322 A1 | 10/2012 | Shiota |

FOREIGN PATENT DOCUMENTS

| | | |
|---|---|---|
| JP | H06-013259 A | 1/1994 |
| JP | 08-045777 A | 2/1996 |
| JP | 09-153433 A | 6/1997 |
| JP | 10-22161 A | 1/1998 |
| JP | 10-050545 A | 2/1998 |
| JP | 11-297566 A | 10/1999 |
| JP | 11-340083 A | 12/1999 |
| JP | 2000-124057 A | 4/2000 |
| JP | 2000-235935 A | 8/2000 |
| JP | 2002-170736 A | 6/2002 |
| JP | 2002-299148 A | 10/2002 |
| JP | 2005-136132 A | 5/2005 |
| JP | 2005-259772 A | 9/2005 |
| JP | 2005-303160 A | 10/2005 |
| JP | 2006310700 A * | 11/2006 |
| JP | 2007-243040 A | 9/2007 |
| JP | 2009-16796 A | 1/2009 |
| JP | 2009-176771 A | 8/2009 |
| JP | 2010-093038 A | 4/2010 |
| JP | 2010-103566 A | 5/2010 |
| JP | 2010-153485 A | 7/2010 |
| JP | 2010-267915 A | 11/2010 |
| JP | 2011-003846 A | 1/2011 |
| WO | 2011071145 A1 | 6/2011 |
| WO | 2011071146 A1 | 6/2011 |

OTHER PUBLICATIONS

U.S. Final Office Action dated Dec. 21, 2017 issued in U.S. Appl. No. 15/386,081.
U.S. Non-Final Office Action dated Apr. 14, 2017 issued in U.S. Appl. No. 15/386,081.
Non-Final Office Action U.S. Appl. No. 14/446,615 dated Sep. 30, 2016.
Partial Reexamination Report JP Patent Application No. 2013-184880 dated Jul. 14, 2016 with English translation.
Chinese Office Action issued in Chinese Application No. 201110390648.0 dated May 26, 2014 with English translation.
Notice of Allowance U.S. Appl. No. 13/280,886 dated Apr. 30, 2014.
Final Office Action U.S. Appl. No. 13/280,886 dated Dec. 10, 2013.
Non-Final Office Action U.S. Appl. No. 13/280,886 dated Aug. 30, 2013.
Decision of Rejection issued in Japanese Patent Application No. 2011-235781 dated May 7, 2013.
Japanese Office Action, and English translation thereof, issued in Japanese Patent Application No. 2011-235781 dated Nov. 13, 2012.
Non-Final Office Action U.S. Appl. No. 14/446,615 dated Sep. 3, 2014.
Non-Final Office Action U.S. Appl. No. 14/446,615 dated Dec. 19, 2014.
English language machine translation of JP 2009-1761771 A, cited in Dec. 19, 2014 office action, retrieved from httl://www.ipdl.inpit.go.jp pp. 1-14.
Notice of Allowance U.S. Appl. No. 14/446,615 dated Apr. 29, 2015.
Final Office Action U.S. Appl. No. 14/446,615 dated Sep. 2, 2015.
Notice of Office Action Japanese Patent Application No. 2013-184880 dated Jul. 14, 2015 with full English translation.
Final Office Action U.S. Appl. No. 14/446,615 dated May 25, 2016.
Decision of Rejection Japanese Patent Application No. 2013-184880 dated Dec. 22, 2015 with English translation.

* cited by examiner

A-A'

B-B'

MULTILAYER CERAMIC CAPACITOR HAVING SIDE MEMBERS

CROSS-REFERENCE TO RELATED APPLICATIONS

This application is a Continuation Application of U.S. application Ser. No. 15/386,081, filed Dec. 21, 2016 which is a Continuation Application of U.S. application Ser. No. 14/446,615, filed Jul. 30, 2014, which is a Continuation Application of U.S. application Ser. No. 13/280,886 filed Oct. 25, 2011, now U.S. Pat. No. 8,824,119, which claims the priority of Korean Patent Application No. 10-2011-0021080 filed on Mar. 9, 2011, in the Korean Intellectual Property Office, the disclosure of each is incorporated herein by reference, in entirety.

BACKGROUND OF THE INVENTION

Field of the Invention

The present invention relates to a multilayer ceramic capacitor and a method of manufacturing the same, and more particularly, to a high-capacity multilayer ceramic capacitor having excellent reliability and a method of manufacturing the same.

Description of the Related Art

Generally, electronic components using a ceramic material such as a capacitor, an inductor, a piezoelectric element, a varistor, a thermistor, or the like, include a ceramic body made of a ceramic material, inner electrodes formed within the ceramic body, and outer electrodes mounted on surfaces of the ceramic body so as to be connected to the inner electrodes.

The multilayer ceramic capacitor, among ceramic electronic components, is configured to include a plurality of stacked dielectric layers, inner electrodes disposed to be opposed to each other, having each dielectric layer therebetween, and outer electrodes electrically connected to the inner electrodes.

The multilayer ceramic capacitor has been widely used as a component of a mobile communication apparatus such as a computer, a PDA, a mobile phone, or the like, due to advantages such as miniaturization, high capacity, ease of mounting, and the like.

Recently, as electronic products have become miniaturized and multi-functional, chip parts have also tended to be miniaturized and multi-functional. As a result, there is a need to miniaturize the multilayer ceramic capacitor while increasing the capacity thereof.

In order to increase the capacity of the multilayer ceramic capacitor, a method of thinning the dielectric layers, a method of highly multilayering thinned dielectric layers, and a method of increasing a coverage of an inner electrode, or the like, have been proposed. Further, a method of increasing an overlapping area between inner electrodes forming capacity has been proposed. In order to increase the overlapping area between the inner electrodes, a margin portion area of dielectric layers on which the inner electrodes are not formed should be minimized.

Generally, the multilayer ceramic capacitor may be manufactured as follows. First, an inner electrode is formed by manufacturing a ceramic green sheet and printing a conductive paste on the ceramic green sheet. A green ceramic laminate is manufactured by multilayerIng the ceramic green sheets, on which the inner electrodes are formed, from several layers to several hundred layers. Thereafter, the solid green ceramic laminate is manufactured by compressing the green ceramic laminate at high temperature and high pressure and the solid green ceramic laminate is subjected to a cutting process to manufacture green chips. Thereafter, the multilayer ceramic capacitor is completed by plasticizing and firing the green chip and then, forming the outer electrodes thereon.

When the multilayer ceramic capacitor is formed by the above-mentioned manufacturing method, it is difficult to minimize an area of a margin portion of the dielectric layer on which the inner electrodes are not formed and thus, there is a limitation in increasing the overlapping area of the inner electrodes.

SUMMARY OF THE INVENTION

The present invention provides a high-capacity multilayer ceramic capacitor having excellent reliability and a method of manufacturing the same.

According to the exemplary embodiment of the present invention, there is provided a multilayer ceramic capacitor, including: a ceramic body having a first side and a second side opposed to each other and having a third side and a fourth side connecting the first side to the second side; a plurality of inner electrodes formed within the ceramic body and having respective one ends exposed to the third side and the fourth side; and outer electrodes formed on the third side and the fourth side and electrically connected to the inner electrodes, wherein a distance from distal edges of the inner electrodes to the first side or the second side of the ceramic body is 30 μm or less.

The ceramic body may be configured to include a multilayer body in which a plurality of dielectric layers having a length forming a distance between the third side and the fourth side of the ceramic body and a width the same as that of the inner electrodes are stacked, and a first side member and a second side member forming the distance from the distal edges of the inner electrodes to the first side or the second side of the ceramic body.

The first side member and the second side member may be made of ceramic slurry.

The distance from the distal edges of the inner electrodes to the first side or the second side of the ceramic body may be 2 to 20 μm.

The distance from the distal edges of the inner electrodes to the first side or the second side of the ceramic body may be 10 to 20 μm.

The inner electrodes may include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

According to another exemplary embodiment of the present invention, there is provided a multilayer ceramic capacitor, including a multilayer body, first and second side members, and outer electrodes. The multilayer body includes a plurality of inner electrodes. The multilayer body having a first side and a second side opposed to each other and having a third side and a fourth side connecting the first side to the second side. The first and second side members are formed on the first and second sides of the multilayer body, respectively. At least one width of the first side member and the second side member is 30 μm or less. The outer electrodes are formed on the third side and the fourth side to be electrically connected to the inner electrodes.

The first side member and the second side member may be formed by ceramic slurry.

The width of the first side member or the second side member may be 2 to 20 μm.

The width of the first side member or the second side member may be 10 to 20 μm.

According to another exemplary embodiment of the present invention, there is provided a method of manufacturing a multilayer ceramic capacitor, the method including: preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance; forming a ceramic green sheet laminate by stacking the first ceramic green sheet and the second ceramic green sheet such that the stripe type first inner electrode patterns and the stripe type second inner electrode patterns are intersected; cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and forming a first side member and a second side member made of ceramic slurry on the sides to which the distal edges of the first inner electrodes and the second inner electrodes are exposed.

The forming of the ceramic green sheet laminate may be performed such that a central portion of each of the stripe-type first inner electrode patterns and a predetermined distance between the stripe-type second inner electrode patterns overlap with each other.

The cutting of the ceramic green sheet laminate may include cutting the ceramic green sheet laminate into bar-type laminates, each bar-type laminate having sides to which the distal edges of the first inner electrodes and the second inner electrodes are exposed; and after the forming of the first and second side members, cutting the ceramic green sheet into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line.

The cutting of the ceramic green sheet laminate may be performed by cutting the ceramic green sheet into bar-type laminates, each bar-type laminate having sides to which the distal edges of the first inner electrodes and the second inner electrodes are exposed, and cutting the bar-type laminate into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line; and the forming of the first and second side members may be performed on the multilayer body.

The forming of the first side member and the second side member may be performed by applying ceramic slurry to the sides to which the distal edges of the first inner electrodes and the second inner electrodes are exposed.

The forming of the first side member and the second side member may be performed by dipping the sides to which the distal edges of the first inner electrodes and the second inner electrodes are exposed in ceramic slurry.

The widths of the first side member and the second side member defined from surfaces to which the first inner electrodes and the second inner electrodes are exposed are set to be 30 μm or less by controlling the amount of the ceramic slurry.

According to another exemplary embodiment of the present invention, there is provided a method of manufacturing a multilayer ceramic capacitor. According to the method, a plurality of ceramic green sheets including a plurality of inner electrode patterns formed thereon are prepared. The ceramic green sheets are laminated to form a ceramic green sheet laminate. The ceramic green sheet laminate is cut to allow the ceramic green sheet laminate to have a side to which distal edges of the inner electrodes are exposed. A side member having a width of 30 μm or less is formed on the cut side to which the distal edges of the inner electrodes are exposed. The ceramic green sheet laminate and the side member are sintered to form a ceramic body.

The side to which the distal edges of the inner electrodes are exposed may be dipped in ceramic slurry to form the side member.

The width of the side member may be 2 μm to 20 μm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
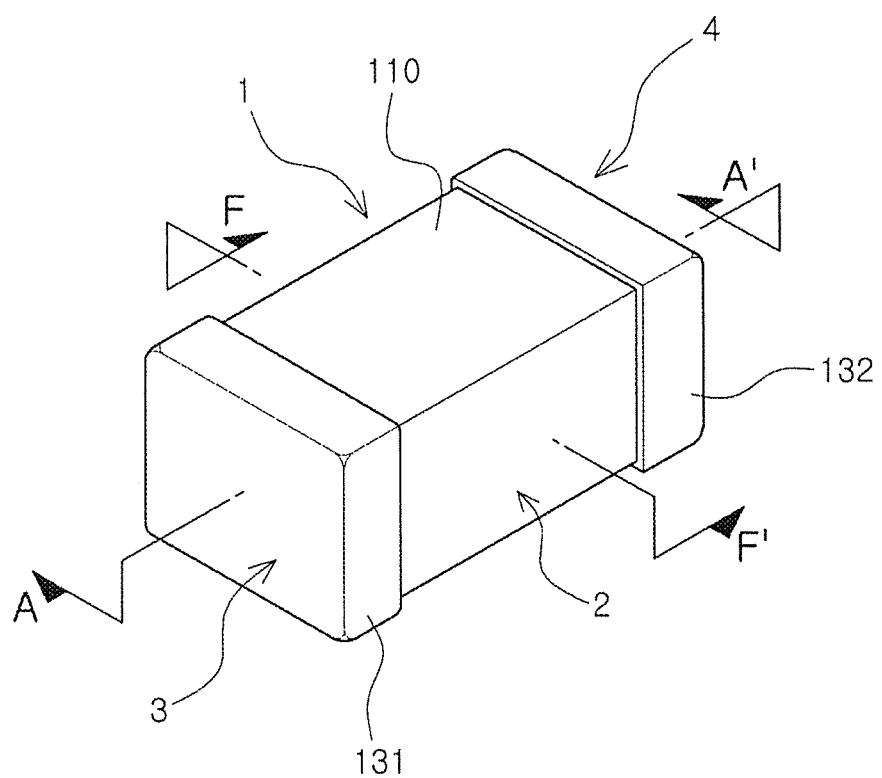
FIG. 1A is a schematic perspective view showing a multilayer ceramic capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of components are exaggerated for clarity. The same or equivalent elements are referred to by the same reference numerals throughout the specification.

Figure 1B:
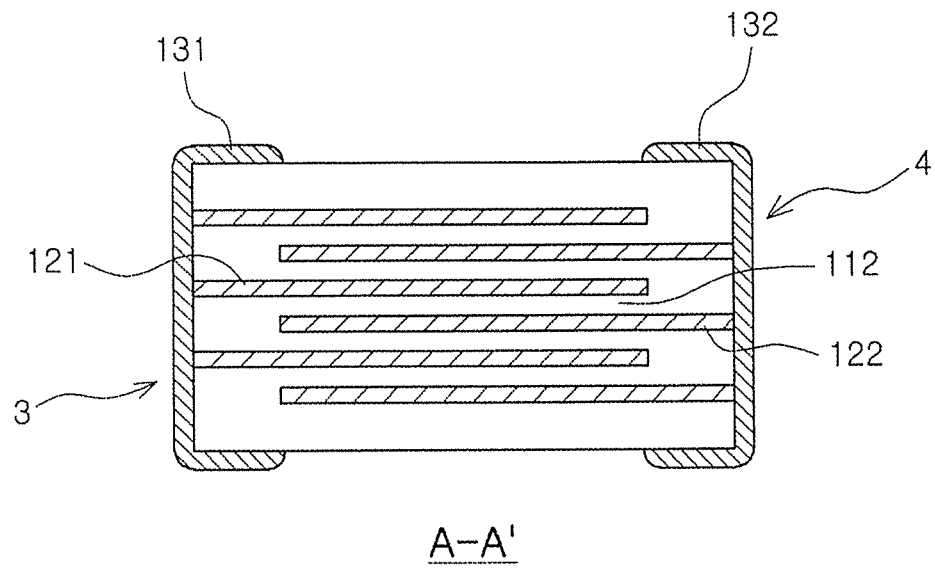
FIG. 1B is a cross-sectional view of the multilayer ceramic capacitor taken along line A-A' of FIG. 1A.
Figure 1C:
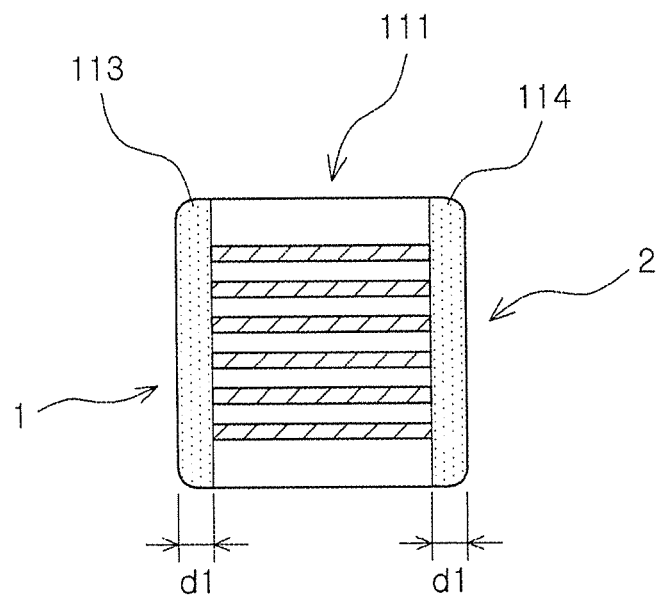
FIG. 1C is a cross-sectional view of the multilayer ceramic capacitor taken along line B-B' of FIG. 1A.
Figure 1D:
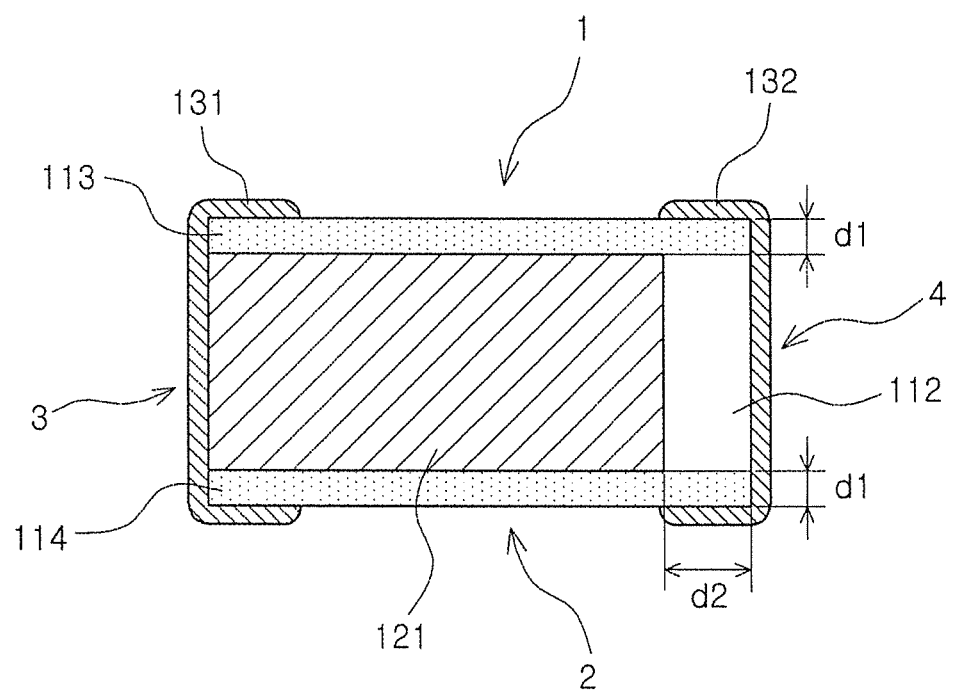
FIG. 1D is a top plan view of the multilayer ceramic capacitor showing one dielectric layer constituting the multilayer ceramic capacitor shown in FIG. 1A.

FIG. 1A is a schematic perspective view showing a multilayer ceramic capacitor according to an exemplary embodiment of the present invention. FIG. 1B is a cross-sectional view of the multilayer ceramic capacitor taken along line A-A' of FIG. 1A. FIG. 1C is a cross-sectional view of the multilayer ceramic capacitor taken along line B-B' of FIG. 1A. FIG. 1D is a top plan view of of the multilayer ceramic capacitor showing one dielectric layer constituting the multilayer ceramic capacitor shown in FIG. 1A.

Referring to FIGS. 1A to 1D, the multilayer ceramic capacitor according to the exemplary embodiment of the present invention is configured to include a ceramic body 110, a plurality of inner electrodes 121 and 122 formed within the ceramic body, and outer electrodes 131 and 132 formed on outer surfaces of the ceramic body.

The ceramic body 110 may have a first side 1 and a second side 2 to be opposed to each other and a third side 3 and a fourth side 4 connecting the first side to the second side.

The shape of the ceramic body 110 is not particularly limited, but may be a rectangular parallelepiped shape having the first to fourth sides as shown in FIG. 1.

The plurality of inner electrodes 121 and 122 formed within the ceramic body 110 have respective ends exposed to the third side 3 and the fourth side 4 of the ceramic body.

The inner electrodes 121 and 122 may be a pair of a first inner electrode 121 and a second inner electrode 122 having different polarities. One end of the first inner electrode 121 may be exposed to the third side 3 and one end of the second inner electrode 122 may be exposed to the fourth side 4. The other ends of the first inner electrode 121 and the second inner electrode 122 may be formed to be spaced apart from the third side 3 or the fourth side 4 by a predetermined distance. A detailed description thereof will be described below.

The third side 3 and the fourth side 4 of the ceramic body may have the first and second outer electrodes 131 and 132 formed thereon to be electrically connected to the inner electrodes.

The plurality of inner electrodes are formed within the ceramic body and a distance d1 from each distal edge of the Plurality of inner electrodes to the first side or the second side may be 30 μm or less. This may imply that the average distance d1 from the distal edges of the plurality of inner electrodes to the first side or the second side is 30 μm or less on average.

The distal edge of the inner electrode implies one area of the inner electrode toward the first side 1 or the second side 2 of the ceramic body. An area from the distal edge of the inner electrode to the first side or the second side may be referred to as a first side member 113 or a second side member 114.

The distance d1 from the distal edge of the inner electrode to the first side 1 or the second side 2 may have a slight difference in the plurality of inner electrodes; however according to the exemplary embodiment of the present invention, has no deviation or a slight deviation. This characteristic may be more clearly understood by a method of manufacturing a multilayer ceramic capacitor according to the exemplary embodiment of the present invention.

According to the exemplary embodiment of the present invention, the ceramic body 110 may include a multilayer body 111 in which a plurality of dielectric layers 112 are stacked and a first side member 113 and a second side member 114 formed on both sides of the multilayer body 111. In this case, the distance d1 from the distal edge of the plurality of inner electrodes to the first side or the second side is formed by the first side member 113 and the second side member 114. That is, the distance d1 corresponds to the width of the first side member 113 or the second side member 114.

The plurality of dielectric layers 112 constituting the multilayer body 111, is in a sintered state, and may be integrated such that a boundary between adjacent dielectric layers may not be readily apparant.

The length of the multilayer body 111 corresponds to the length of the ceramic body 110 and the length of the ceramic body 110 corresponds to the distance from the third side 3 to the fourth side 4 of the ceramic body. That is, the third and fourth sides of the ceramic body 110 may be considered to be the third side and the fourth side of the multilayer body 111.

The multilayer body 111 is formed by stacking the plurality of dielectric layers 112 and the length of the dielectric layers 112 forms a distance between the third side 3 and the fourth side 4 of the ceramic body.

Although not limited thereto, according to the exemplary embodiment of the present invention, the length of the ceramic body may be 400 to 1400 μM. In more detail, the length of the ceramic body may be 400 to 800 μm or 600 to 1400 μm.

The inner electrodes 121 and 122 may be formed on the dielectric layers and the inner electrodes 121 and 122 may be formed within the ceramic body by the sintering, while having each dielectric layer therebetween.

Referring to FIG. 1D, the first inner electrode 121 is formed on the dielectric layer 112. The first inner electrode 121 is not formed on the entirety of the longitudinal direction of the dielectric layer. That is, one end of the first inner electrode 121 may be formed up to the third side 3 to be exposed to the third side 3 and the other end of the first inner electrode 121 may be formed to be spaced apart from the fourth side 4 of the ceramic body by a predetermined distance d2.

The one end of the first inner electrode exposed to the third side 3 of the multilayer body 111 is connected to the first outer electrode 131.

Differently from the first inner electrode, one end of the second inner electrode 122 is exposed to the fourth side 4 to be connected to the second outer electrode 132 and the other end of the second inner electrode 122 is formed to be spaced apart from the third side 3 by a predetermined distance.

The width of the dielectric layer 112 may be equal to the width of the first inner electrode 121. That is, the first inner electrode 121 may be entirely formed across the width of the dielectric layer 112. The width of the dielectric layer and the width of the inner electrode are based on the first side and the second side of the ceramic body.

Although not limited thereto, according to the exemplary embodiment of the present invention, the width of the dielectric layer and the width of the inner electrode may be 100 to 900 μm. In more detail, the width of the dielectric layer and the width of the inner electrode may be 100 to 500 μm or 100 to 900 μm, respectively.

As the ceramic body is miniaturized, a width of the side member may have an effect on the electrical characteristics of the multilayer ceramic capacitor. According to the exemplary embodiment of the present invention, the width of the side member may be 30 μm or less, thereby improving the characteristics of the miniaturized multilayer ceramic capacitor.

In the exemplary embodiment of the present invention, the inner electrode and the dielectric layer are formed by being simultaneously cut off, such that the width of the inner electrode may be equal to the width of the dielectric layer. A more detailed description thereof will be described below.

In the exemplary embodiment of the present invention, the width of the inner electrodes is equal to the width of the dielectric layer, such that the distal edges of the inner electrodes may be exposed to the first and second sides of the multilayer body. The first side member 113 and the second side member 114 may be formed on both sides of the multilayer body 111 to which the distal edges of the inner electrodes are exposed.

As described above, the distance d1 from each distal edge of the plurality of inner electrodes to the first side or the second side corresponds to the width of the first side member 113 or the second side member 114.

The widths of the first side member 113 and the second side member 114 may be 30 μm or less. As the widths of the first side member 113 and the second side member 114 are reduced, the overlapping area between the inner electrodes formed within the ceramic body may be relatively wide.

As long as the widths of the first side member 113 and the second side member 114 have a thickness sufficient to prevent a short circuit of the inner electrodes exposed to the sides of the multilayer body 111, they are not particularly limited. For example, the widths of the first side member 113 and the second side member 114 may be 2 μm or more. Preferably, the width of the first side member 113 or the second side member 114 may be 2 to 20 μm, more preferably, 10 to 20 μm.

When the widths of the first and second side members are less than 2 μm, the mechanical strength against the external impact may be degraded, while when the widths of the first and second side members exceed 30 μM, the overlapping area between the inner electrodes is relatively reduced, such that securing the high-capacity multilayer ceramic capacitor may be difficult.

According to the exemplary embodiment of the present invention, the first side member 113 and the second side member 114 may be made of ceramic slurry. The widths of the first side member 113 and the second side member 114 may be easily controlled by controlling the amount of ceramic slurry and may be thinly formed to be 30 μm or less.

As a result of performing various experiments, when the distance from the distal edges of the inner electrodes to the first side and the second side of the ceramic body is designed to be 30 μm or less, it can be appreciated that the multilayer ceramic capacitor has excellent reliability by improving moisture resistance and insulattion resistance characteristics while maximizing the capacity of the multilayer ceramic capacitor.

In order to maximize the capacity of the multilayer ceramic capacitor, a method of thinning the dielectric layers, a method of highly multilayering the thinned dielectric layers, and a method of increasing a coverage of the inner electrode, or the like, have been proposed. Further, a method of increasing an overlapping area between inner electrodes forming capacity has been proposed. In order to increase the overlapping area between the inner electrodes, a margin portion area of a dielectric layer on which the inner electrodes are not formed should be minimized. In particular, as the multilayer ceramic capacitor becomes miniaturized, the margin portion area should be minimized in order to increase the overlapping area between the inner electrodes.

According to the exemplary embodiment of the present invention, the inner electrodes are formed across the width of the dielectric layers and the width of the side member is set to be 30 μm or less, thereby widening the overlapping area between the inner electrodes.

Generally, as the dielectric layer is highly stacked, the thicknesses of the dielectric layer and the inner electrode become thin. Therefore, a phenomenon in which the inner electrodes are shorted may frequently occur. In addition, when the inner electrodes are formed on only a portion of the dielectric layer, steps due to the inner electrodes may be generated, whereby the lifespan or the reliability of the insulation resistance may be degraded.

However, according to the exemplary embodiment of the present invention, although the inner electrodes and the dielectric layer are thinly formed, the inner electrodes are entirely formed across the width of the dielectric layer to increase the overlapping area between the inner electrodes, thereby increasing the capacity of the multilayer ceramic capacitor.

In addition, the multilayer ceramic capacitor with excellent reliability while having the excellent capacity characteristics may be provided by reducing the steps due to the inner electrodes so as to improve the lifespan of the insulation resistance.

Hereinafter, a method of manufacturing a multilayer ceramic capacitor according to the exemplary embodiment of the present invention will be described below.

FIGS. 2A to 2F are cross-sectional views and perspective views schematically showing a method of manufacturing a multilayer ceramic capacitor according to an exemplary embodiment of the present invention.

Figure 2A:
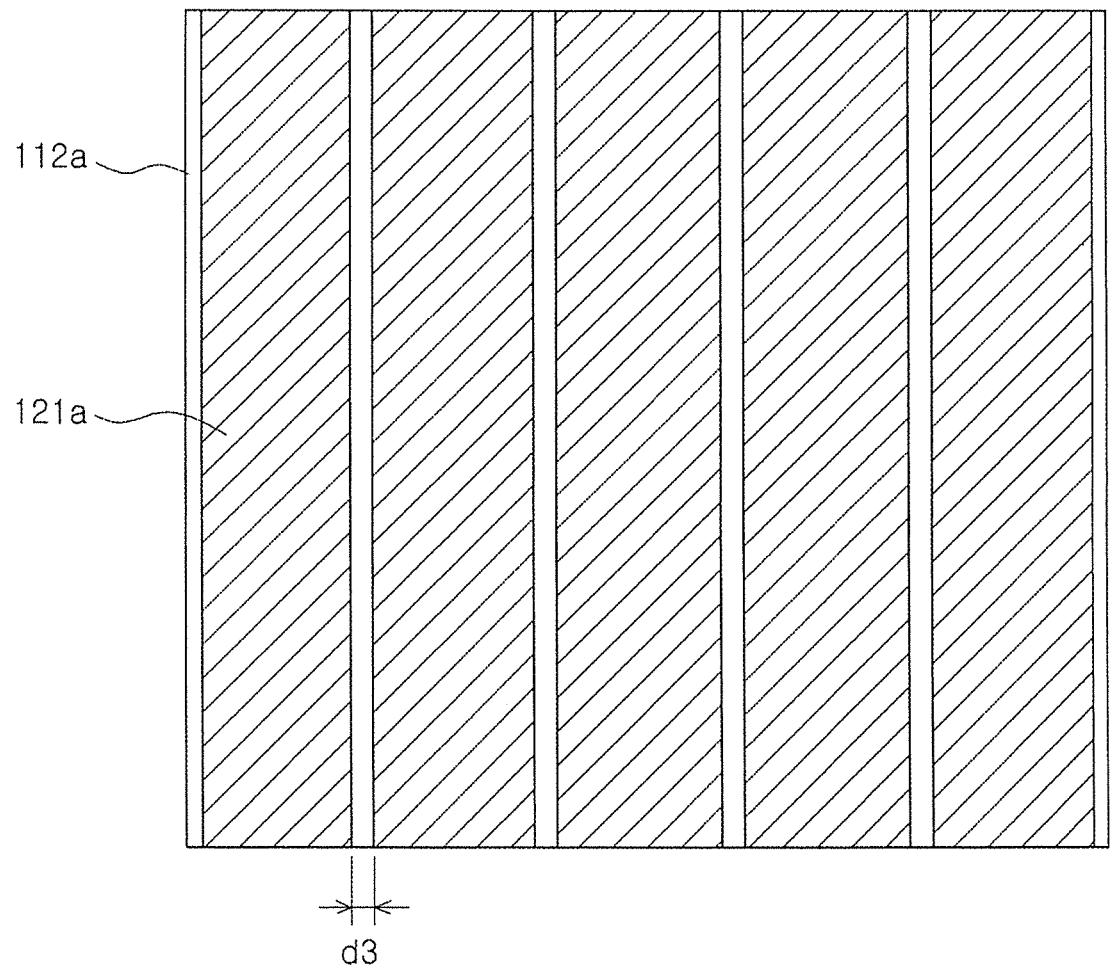
FIGS. 2A to 2F are cross-sectional views and perspective views schematically showing a method of manufacturing a multilayer ceramic capacitor according to an exemplary embodiment of the present invention.

As shown in FIG. 2A, a plurality of stripe-type first inner electrode patterns 121a may be formed on a ceramic green sheet 112a to be spaced apart from one another by a predetermined distance d3. The plurality of stripe-type first inner electrode patterns 121a may be formed in parallel with one another.

The predetermined distance d3 is a distance to allow the inner electrodes to be insulated from the outer electrodes having different polarities and may be considered as a distance of d2×2 shown in FIG. 1D.

The ceramic green sheet 112a may be made of ceramic paste including a ceramic powder, an organic solvent, and an organic binder.

The ceramic powder is a material having high permittivity, but is not limited thereto. A barium titanate ($BaTiO_3$) material, a lead complex Perovskite material, a strontium titanate ($SrTiO_3$) material, or the like, may be used, preferably, a barium titanate ($BaTiO_3$) powder may be used. When the ceramic green sheet 112a having the plurality of stripe-type first inner electrode patterns 121a formed thereon is fired, it may become a dielectric layer 112 constituting the ceramic body.

The stripe-type first inner electrode patterns 121a may be made of the inner electrode paste including a conductive metal. The conductive metal is not limited thereto, but may be Ni, Cu, Pd, or an alloy thereof.

A method of forming the stripe-type first inner electrode pattern 121a on the ceramic green sheet 121a is not particularly limited, but may be formed by, for example, a printing method such as a screen printing method or a gravure printing method.

Further, although not shown, a plurality of stripe-type second inner electrode patterns 122a may be formed on another ceramic green sheet 112a by a predetermined distance.

Hereinafter, the ceramic green sheet on which the first inner electrode patterns 121a are formed may be referred to as the first ceramic green sheet and the ceramic green sheet on which the second inner electrode patterns 122a are formed may be referred to as the second ceramic green sheet.

Figure 2B:
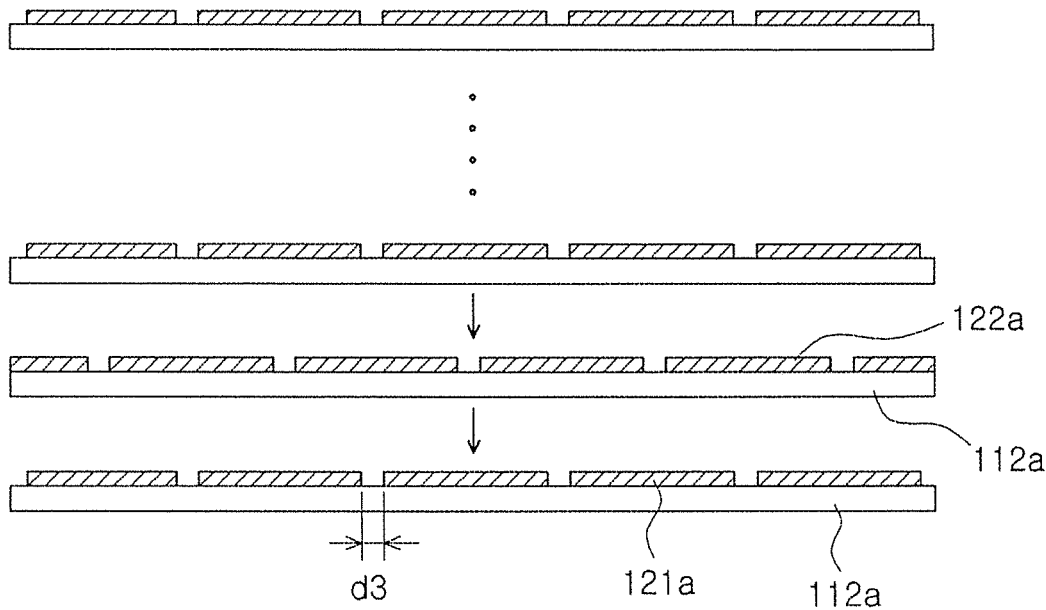

Next, as shown in FIG. 2B, the first and second ceramic green sheets may be alternately stacked such that the stripe-type first inner electrode patterns 121a and the stripe-type second inner electrode patterns 122a are alternately stacked.

Thereafter, each stripe-type first inner electrode pattern 121a may form the first inner electrode 121 and each stripe-type second inner electrode pattern 122a may form the second inner electrode 122.

Figure 2C:
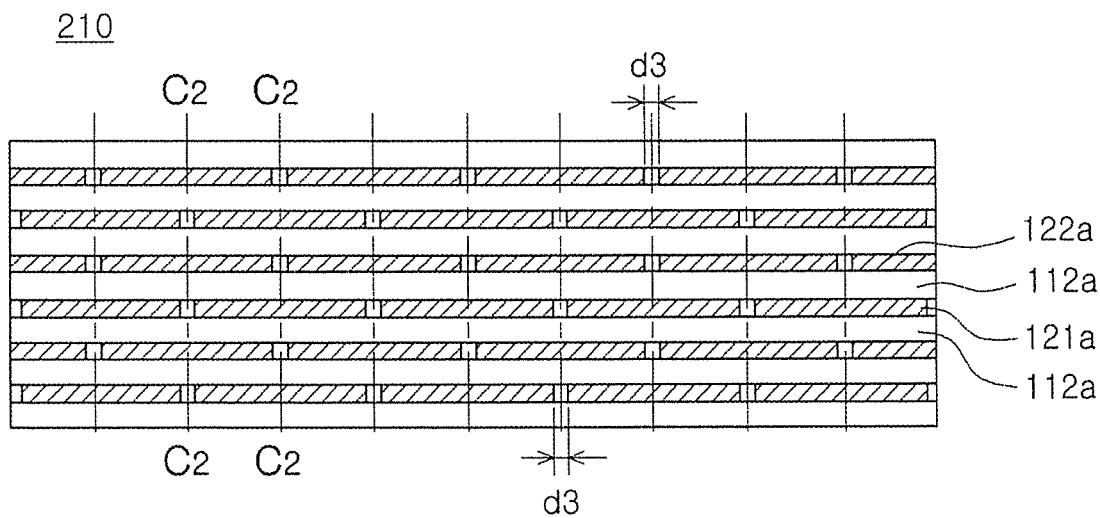
Figure 2D:
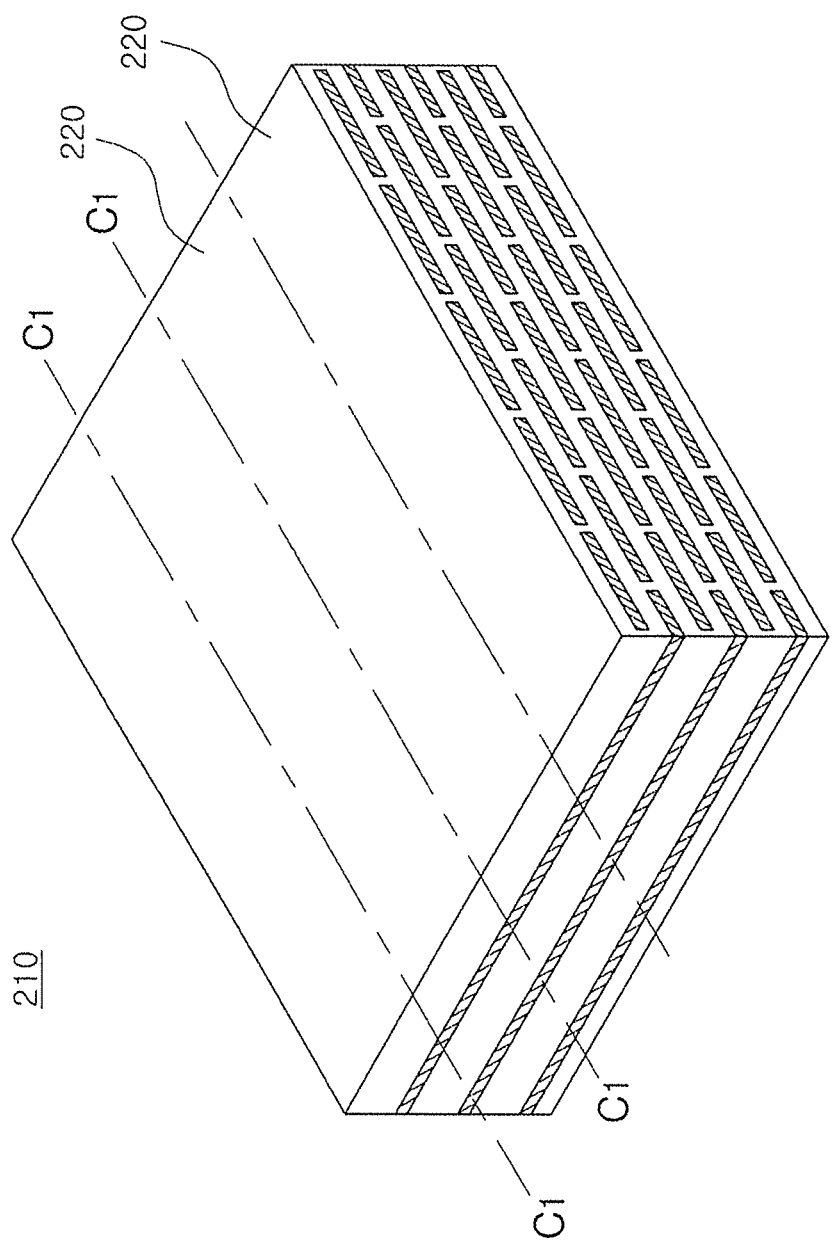

FIG. 2C is a cross-sectional view of a ceramic green sheet laminate 210 on which the first and second ceramic green sheets are stacked according to the exemplary embodiment of the present invention and FIG. 2D is a perspective view of the ceramic green sheet laminate 210 on which the first and second ceramic green sheets are stacked.

Referring to FIGS. 2C and 2D, the first ceramic green sheet on which the plurality of parallel stripe-type first inner electrode patterns 121a are printed and the second ceramic green sheet on which the plurality of parallel stripe-type second inner electrode patterns 122a are printed are alternately stacked.

In more detail, the first ceramic green sheet and the second ceramic green sheet are stacked in such a manner that the central portion of the stripe-type first inner electrode pattern 121a printed on the first ceramic green sheet and the distance d3 between the stripe-type second inner electrode patterns 122a printed on the second ceramic green sheet overlap with each other.

Next, as shown in FIG. 2D, the ceramic green sheet laminate 210 may be cut so as to traverse the plurality of stripe-type first inner electrode patterns 121a and the plurality of stripe-type second inner electrode patterns 122a. That is, the ceramic green sheet laminate 210 may be cut into bar-type laminates 220 along cutting line C1-C1.

In more detail, the stripe-type first inner electrode patterns 121a and the stripe-type second inner electrode patterns 122a may be cut in a longitudinal direction to be divided into a plurality of inner electrodes having a constant width. In this case, the stacked ceramic green sheets are cut together with the inner electrode patterns. As a result, dielectric layers having the same width as the width of the inner electrodes may be formed.

The distal edges of the first and second inner electrodes may be exposed to the cut surfaces of each of the bar-type laminates 220. The cut surfaces of the bar-type laminate 220 may each be referred to as the first side and the second side of the bar-type laminate.

The ceramic green sheet laminate 210 may be cut into the bar-type laminate 220 after the firing thereof. Further, the ceramic green sheet is cut into the bar-type laminates, and then subjected to the firing. Although not limited thereto, the firing may be performed under an $N_2$—$H_2$ atmosphere at a temperature of 1100° C. to 1300° C.

Figure 2E:
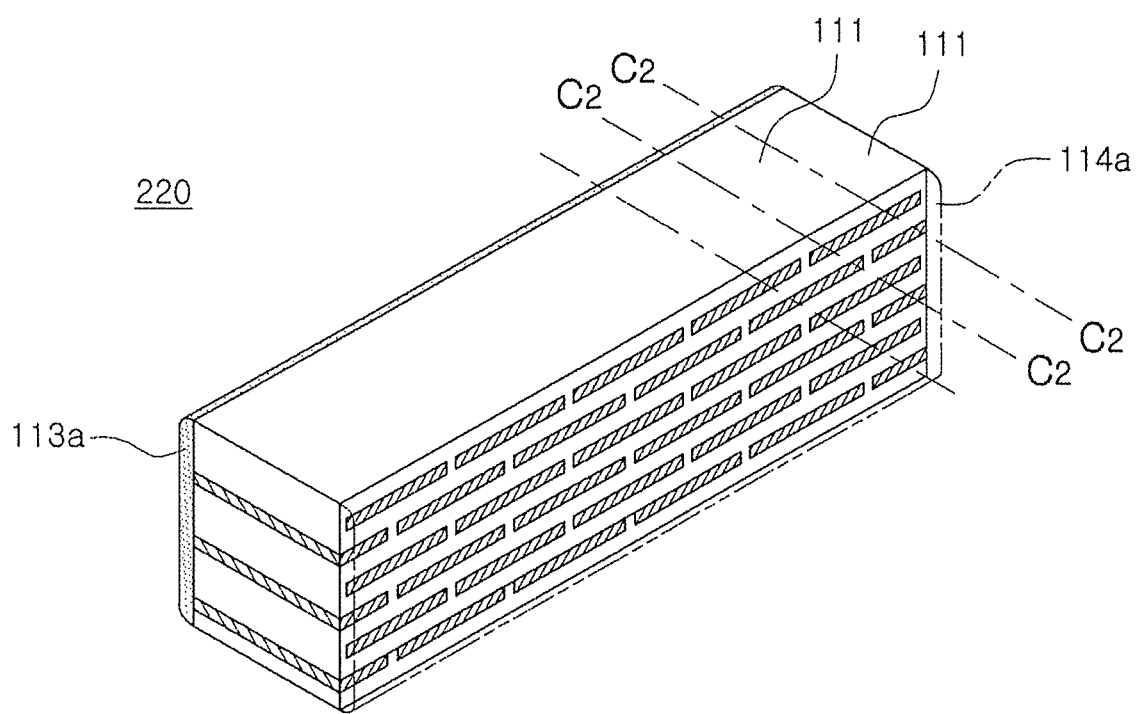

Next, as shown in FIG. 2E, the first side and second sides of the bar-type laminate 220 may each be provided with a first side member 113a and a second side member 114a. The second side member 114a is not clearly shown and the contour thereof is shown as a dotted line.

The first and second sides of the bar-type laminate 220 may be considered to correspond to the first side 1 and the second side 2 of the multilayer body 111 shown in FIG. 1C.

The first and second side members 113a and 114a may be made of ceramic slurry containing a ceramic powder in the bar-type laminate 220.

The ceramic slurry includes a ceramic powder, an organic binder, and an organic solvent and the amount of the ceramic slurry may be controlled such that the first and second side members 113a and 114a have the desired thickness.

The first and second side members 113a and 114a may be formed by applying the ceramic slurry to the first and second sides of the bar-type laminate 220. A method of applying the ceramic slurry is not particularly limited and therefore, the ceramic slurry may be sprayed by a spray method or may be applied using a roller.

In addition, the first and second sides of the bar-type laminate may be dipped in the ceramic slurry to have the first and second side members 113a and 114a formed thereon.

As described above, the widths of the first and second side members may be 30 μm or less. The widths of the first and second side members may be defined by the first side or the second side of the bar-type laminate to which the distal edges of the inner electrodes are exposed.

Figure 2F:
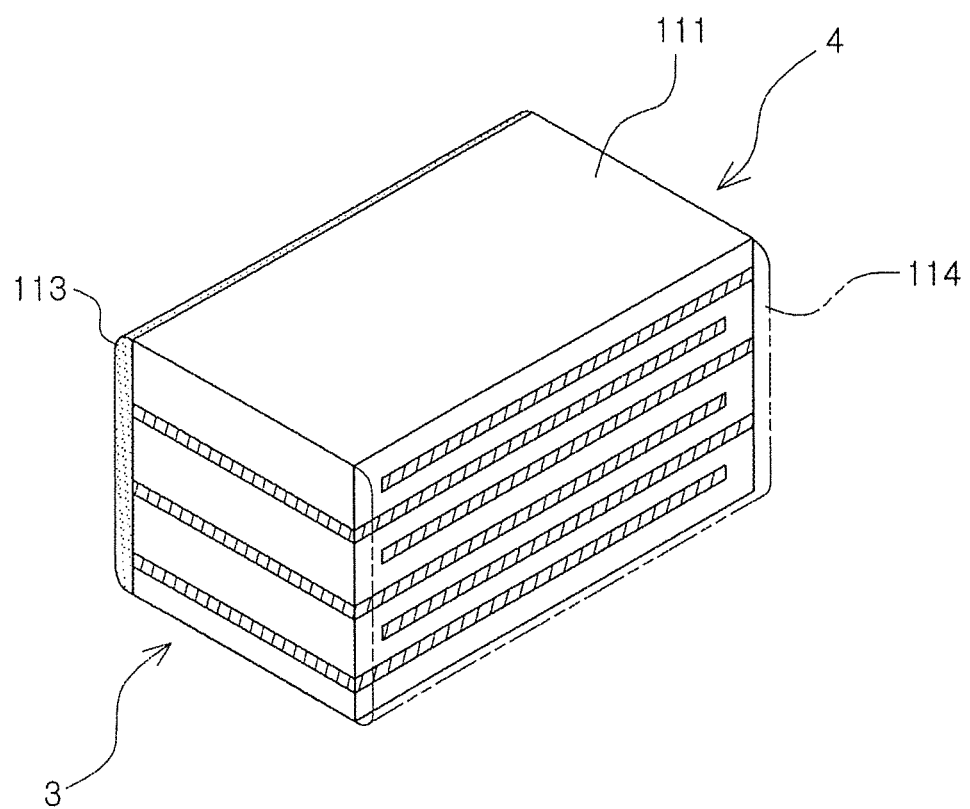

Next, as shown in FIGS. 2E and 2F, the bar-type laminate 220 provided with the first and second side members 113a and 114a may be cut along cutting line C2-C2 to correspond to the individual chip size. FIG. 2C may be referenced to determine a position of cutting line C2-C2.

The bar-type laminate 220 is cut into chip sized fragments, thereby forming individual ceramic bodys each having the multilayer body ill and the first and second side members 113 and 114 formed on both sides of the multilayer body. As the bar-type laminate 220 is cut along cutting line C2-C2, the overlapped central portion of the first inner electrode and the predetermined distance d3 formed between the second inner electrodes may be cut along the same cutting line, that is, line C2-C2. Alternatively, the central portion of the second inner electrode and a predetermined distance between the first inner electrodes may be cut along the same cutting line.

Therefore, one ends of the first inner electrode and the second inner electrode may be alternately exposed to cut surfaces along cutting line C2-C2. The surface to which the first inner electrode is exposed may be considered to be the third side 3 of the multilayer body shown in FIG. 1D and the surface to which the second inner electrode is exposed may be considered to be the fourth side 4 of the multilayer body shown in FIG. 1D.

As the bar-type laminate 220 is cut along cutting line C2-C2, the predetermined distance d3 between the stripe-type first inner electrode patterns 121a is cut half, whereby one end of the first inner electrode 121 may form the predetermined distance d2 from the fourth side. In addition, the second inner electrode 122 may form a predetermined distance from the third side.

Next, the third side and the fourth side may be provided with the outer electrodes to be connected to one ends of the first and second inner electrodes.

According to the exemplary embodiment of the present invention, when the bar-type laminate 220 has the first and second side members formed thereon and is cut into chip sized fragments, a plurality of the multilayer bodies 111 may have the side members formed thereon by one-time process.

In addition, although not shown, before forming the first side member and the second side member, the bar-type laminate may be cut into chip sized fragments to form the plurality of multilayer bodies.

That is, the bar-type laminate may be cut in such a manner that the central portion of the first inner electrode and the predetermined distance formed between the second inner electrodes that overlap with each other are cut along the same cutting line. Therefore, one ends of the first inner electrodes and the second inner electrodes may be alternately exposed to the cut surface.

Thereafter, the first and second sides of the multilayer body may have the first side member and the second side member formed thereon. The method of forming the first and second side members will be described above.

Further, the third side of the multilayer body to which the first inner electrode is exposed and the fourth side of the multilayer body to which the second inner electrode is exposed may each have the outer electrodes formed thereon.

According to the exemplary embodiment of the present invention, the distal edges of the first and second inner electrodes are exposed through the first and second sides of the multilayer body. The plurality of stacked first and second inner electrodes are simultaneously cut, such that the distal edge of the inner electrode may be disposed on a straight line. Thereafter, the first and second sides of the multilayer body may be integrally provided with the first side member and the second side member. The ceramic body is formed to include the multilayer body and the first and second side members. That is, the first and second side members forms the first and second sides of the ceramic body.

Therefore, according to the exemplary embodiment of the present invention, the distance from the distal edges of the plurality of inner electrodes to the first and second sides of the ceramic body may be constant. Further, the first and second side members are made of ceramic slurry and the thickness thereof may be formed thinly.

As described above, the inner electrodes may be entirely formed across the width of the dielectric layer, excepting for the minimum area on the dielectric layer, to maintain insulation from the outer electrodes having different polarities. Therefore, forming the overlapping area between the inner electrodes may be faciliated and maximizing the capacity of the capacitor may be allowed by increasing the overlapping area between the inner electrodes.

In addition, it is possible to prevent a degradation of the lifespan or the reliability of the insulation resistance by reducing the occurrence of steps due to the inner electrodes.

As set forth above, according to the exemplary embodiment of the present invention, the distance from each distal edge of the plurality of inner electrodes to the first side or the second side of the ceramic body may be 30 μm or less.

The high capacity multilayer ceramic capacitor may be obtained by maximizing the overlapping area between the inner electrodes while securing the mechanical strength by setting the widths of the first and second side members to an appropriate range.

Further even though the dielectric layer and the inner electrode are thinly formed, the lifespan or reliability of the insulation resistance may be improved by preventing the short circuits of the inner electrodes and reducing the occurrence of the steps due to the inner electrodes.

In addition, according to the exemplary embodiment of the present invention, the plurality of stacked first and second inner electrodes are simultaneously cut, such that the distal edge of the inner electrode may be disposed on a straight line. Thereafter, the first and second sides of the multilayer body may be integrally provided with the first side member and the second side member. Therefore, the distance from the distal edges of the plurality of inner electrodes to the first and second sides of the ceramic body may be constant. Further, the first and second side members are made of ceramic slurry and the thickness thereof may be formed thinly.

Further, the inner electrodes may be entirely formed across the width of the dielectric layer, excepting for the minimum area on the dielectric layer to maintain the insulation from the outer electrodes having different polarities. Therefore, forming the overlapping area between the inner electrodes may be faciliated and maximizing the capacity of the capacitor may be allowed by increasing the overlapping area between the inner electrodes.

In addition, it is possible to prevent a degradation of the lifespan or the reliability of the insulation resistance by reducing the occurrence of steps due to the inner electrodes.

While the present invention has been shown and described in connection with the exemplary embodiments, it will be apparent to those skilled in the art that modification and variation can be made withough departing from the spirit and scope of the invention as defined by the appended claims.

What is claimed is:

1. A multilayer ceramic capacitor, comprising:
a ceramic body having a first side and a second side opposed to each other, having a third side and a fourth side connecting the first side to the second side, and having a fifth side and a sixth side connecting the first side to the second side and connecting the third side to the fourth side;
a plurality of inner electrodes disposed within the ceramic body, having respective one ends exposed to the third side and the fourth side; and
first and second outer electrodes disposed on the third side and the fourth side and electrically connected to the inner electrodes,
wherein the ceramic body includes a multilayer body in which a plurality of dielectric layers formed of a same material and having a substantially same width as those of the inner electrodes are stacked, and a first side member and a second side member respectively disposed on the first side and the second side of the ceramic body,
the first and second outer electrodes each extend to the fifth side and the sixth side to contact a portion of the uppermost dielectric layer on the fifth side and a portion of the lowermost dielectric layer on the sixth side, and
each of the first side member and the second side member has ends that are curved only along edges shared between one of the first side or the second side of the ceramic body and one of the fifth side or the sixth side of the ceramic body, and a middle portion disposed between the ends and having a width of more than 2 μm and 20 μm or less, and a radius of curvature of the ends that are curved is less than the width of the middle portion.

2. The multilayer ceramic capacitor of claim 1, wherein the ceramic body has a length of a range of 400 μm or more and 1400 μm or less between the third and fourth sides and has a width of a range of 100 μm or more and 900 μm or less between the first and second sides.

3. The multilayer ceramic capacitor of claim 2, wherein the length between the third and fourth sides is from 400 μm to 800 μm.

4. The multilayer ceramic capacitor of claim 2, wherein the width between the first and second sides is from 100 μm to 500 μm.

5. The multilayer ceramic capacitor of claim 1, wherein the plurality of dielectric layers have the length forming a distance between the third side and the fourth side of the ceramic body.

6. The multilayer ceramic capacitor of claim 5, wherein the first side member and the second side member are made of ceramic slurry.

7. The multilayer ceramic capacitor of claim 1, wherein the inner electrodes include a first inner electrode of which one end is exposed to the third side and the other end is spaced apart from the fourth side by a predetermined distance and a second inner electrode of which one end is exposed to the fourth side and the other end is spaced apart from the third side by another predetermined distance.

8. The multilayer ceramic capacitor of claim 1, wherein any dielectric layer of the ceramic body has distal edges opposing each other,
   distal edges of all the dielectric layers of the ceramic body exposed to the first side are coplanar to each other, and
   distal edges of all the dielectric layers of the ceramic body exposed to the second side are coplanar to each other.

9. The multilayer ceramic capacitor of claim 1, wherein the width of the first side member or the second side member of the ceramic body is more than 2 µm and 10 µm or less.

10. A multilayer ceramic capacitor, comprising:
   a plurality of dielectric layers formed of a same material and stacked in a thickness direction constituting a multilayer body, each of the plurality of dielectric layers including a first end, a second end opposing the first end in a first direction, a third end, and a fourth end opposing the third end in a second direction; and
   a plurality of first internal electrodes and a plurality of second internal electrodes alternately disposed on the plurality of dielectric layers,
   wherein, in the thickness direction:
      the first ends of the plurality of dielectric layers are aligned to a plurality of first ends of the plurality of first internal electrodes and a plurality of first ends of the plurality of second internal electrodes,
      the second ends of the plurality of dielectric layers are aligned to a plurality of second ends of the plurality of first internal electrodes and a plurality of second ends of the plurality of second internal electrodes,
      the third ends of the plurality of dielectric layers are aligned to a plurality of third ends of the plurality of first internal electrodes, and
      the fourth ends of the plurality of dielectric layers are aligned to a plurality of third ends of the plurality of second internal electrodes,
   wherein the multilayer ceramic capacitor further comprises:
      a first outer electrode covering the plurality of third ends of the plurality of first internal electrodes and the plurality of third ends of the plurality of dielectric layers so as to electrically connect to the plurality of first internal electrodes, and contacting portions of surfaces of outermost dielectric layers of the plurality of dielectric layers;
      a second outer electrode covering the plurality of third ends of the plurality of second internal electrodes and the plurality of fourth ends of the plurality of dielectric layers so as to electrically connect to the plurality of second internal electrodes, and contacting other portions of the surfaces of the outermost dielectric layers of the plurality of dielectric layers;
      a first side member covering the plurality of first ends of the plurality of first internal electrodes, the plurality of first ends of the plurality of second internal electrodes, and the plurality of first ends of the plurality of dielectric layers; and
      a second side member covering the plurality of second ends of the plurality of first internal electrodes, the plurality of second ends of the plurality of second internal electrodes, and the plurality of second ends of the plurality of dielectric layers, and
   wherein the surfaces of the outermost dielectric layers of the plurality of dielectric layers are disposed in the thickness direction, and
   wherein each of the first side member and the second side member has curved ends that are curved only along edges shared between one of two opposing sides of the multilayer ceramic capacitor opposite each other in the first direction and one of two opposing sides of the multilayer ceramic capacitor opposite each other in the thickness direction, and a middle portion disposed between the curved ends and having a width of more than 2 µm and 10 µm or less, and a radius of curvature of the curved ends is less than the width of the middle portion.

11. The multilayer ceramic capacitor of claim 10, wherein the first side member and the second side member are made of ceramic slurry.

12. The multilayer ceramic capacitor of claim 10, wherein a width, in the first direction, of each of the first and second internal electrodes has a range of 100 µm or more and 900 µm or less, and
   wherein the multilayer body has a length in the second direction having a range of 400 µm or more and 1400 µm or less.

13. The multilayer ceramic capacitor of claim 12, wherein the length between the third and fourth sides is from 400 µm to 800 µm.

14. The multilayer ceramic capacitor of claim 12, wherein the width between the first and second sides is from 100 µm to 500 µm.

15. A multilayer ceramic capacitor, comprising:
   a ceramic body having a first side and a second side opposed to each other in a first direction, having a third side and a fourth side connecting the first side to the second side, and having a fifth side and a sixth side opposed to each other in a third direction and connecting the first side to the second side and connecting the third side to the fourth side, and having a length of a range of 400 µm or more and 1400 µm or less between the third and fourth sides;
   a plurality of inner electrodes disposed within the ceramic body, having respective one ends exposed to the third side and the fourth side, and having a width of a range of 100 µm or more and 900 µm or less between the first and second sides; and
   first and second outer electrodes disposed on the third side and the fourth side and electrically connected to the inner electrodes,
   wherein the ceramic body includes a multilayer body in which a plurality of dielectric layers formed of a same material and having a substantially same width as those of the inner electrodes are stacked, and a first side member and a second side member respectively disposed on the first side and the second side of the ceramic body, having curved ends that are curved only along edges shared between one of two opposing sides of the ceramic body opposite each other in the first direction and one of two opposing sides of the ceramic body opposite each other in the third direction, and having a width of more than 2 µm and 10 µm or less in a middle portion thereof,
   a radius of curvature of the curved ends is less than the width of the middle portion of the first side member and the second side member, and
   the first and second outer electrodes each extend to the fifth side and the sixth side to contact a portion of the uppermost dielectric layer on the fifth side and a portion of the lowermost dielectric layer on the sixth side.

16. The multilayer ceramic capacitor of claim 15, wherein the length between the third and fourth sides is from 400 μm to 800 μm.

17. The multilayer ceramic capacitor of claim 15, wherein the width between the first and second sides is from 100 μm to 500 μm.

* * * * *